United States Patent
Kim et al.

(10) Patent No.: US 9,633,478 B2
(45) Date of Patent: Apr. 25, 2017

(54) DISPLAY APPARATUS AND CONTROL METHOD THEREOF

(71) Applicant: SAMSUNG ELECTRONICS CO., LTD., Suwon-si (KR)

(72) Inventors: Dae-sik Kim, Hwaseong-si (KR); Dong-yeob Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 14/554,231

(22) Filed: Nov. 26, 2014

(65) Prior Publication Data

US 2016/0012641 A1    Jan. 14, 2016

(30) Foreign Application Priority Data

Jul. 8, 2014  (KR) .................. 10-2014-0085134

(51) Int. Cl.
*G06T 19/00* (2011.01)
*G06F 3/00* (2006.01)
*G06F 3/147* (2006.01)
*G06F 1/16* (2006.01)
*G09G 3/34* (2006.01)

(52) U.S. Cl.
CPC .......... *G06T 19/006* (2013.01); *G06F 1/1613* (2013.01); *G06F 3/005* (2013.01); *G06F 3/147* (2013.01); *G09G 3/3406* (2013.01); *G09G 2300/023* (2013.01); *G09G 2340/14* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 2005/0007445 A1* | 1/2005 | Foote | H04N 7/142 348/14.08 |
| 2007/0058867 A1* | 3/2007 | Shieh | G06K 9/325 382/182 |
| 2009/0111515 A1* | 4/2009 | Joo | H04M 1/0208 455/556.1 |
| 2010/0188478 A1* | 7/2010 | Robinson | H04N 7/15 348/14.16 |
| 2012/0015672 A1* | 1/2012 | Jung | G06T 11/00 455/456.3 |
| 2012/0075484 A1* | 3/2012 | Kawamoto | G06T 19/006 348/207.1 |
| 2013/0342757 A1* | 12/2013 | Brown | H04N 5/2354 348/371 |
| 2015/0145773 A1* | 5/2015 | Ito | G06F 3/0346 345/158 |
| 2015/0234508 A1* | 8/2015 | Cho | G06F 3/0412 345/173 |

* cited by examiner

*Primary Examiner* — Xiao Wu
*Assistant Examiner* — Steven Elbinger
(74) *Attorney, Agent, or Firm* — Sughrue Mion, PLLC

(57) ABSTRACT

A display apparatus is provided. The display apparatus includes: a transparent display; a scanner configured to scan an object seen through the transparent display, a position of the scanner being adjustable with respect to the transparent display; and a controller configured to provide information corresponding to the scanned object on the transparent display, in response to occurrence of a predetermined event.

18 Claims, 20 Drawing Sheets

DISPLAY APPARATUS AND CONTROL METHOD THEREOF

CROSS-REFERENCE TO RELATED APPLICATION

This application claims priority from Korean Patent Application No. 10-2014-0085134, filed on Jul. 8, 2014, in the Korean Intellectual Property Office, the disclosure of which is incorporated herein in its entirety by reference.

BACKGROUND

1. Field

Apparatuses and methods consistent with exemplary embodiments relate to a display apparatus which includes a transparent display.

2. Description of the Related Art

Along with the development of electronics, various types of display apparatus are used in various fields. Particularly, recently more and more people study and discuss a next-generation display apparatus which includes a transparent display.

A transparent display is an apparatus that is formed of a transparent display panel so that objects may be viewed through the display panel. In a related art, a display panel is manufactured by using an opaque semiconductor compound such as silicon (Si), gallium arsenic (GaAs), or the like. However, as various application fields, which may not be handled by using the related art display panel, have been developed, attempts to develop new types of electronic device have been made. As a result, a transparent display has been developed.

A transparent display is configured to include a transparent oxide semiconductor layer, and thus, has transparent characteristics. When using a transparent display, a user can see necessary information by means of a screen of the transparent display, while viewing a rear background located at a back side of the transparent display. This characteristic allows the spatial, temporal constraints to be overcome, and thus new ways for utilizing the transparent characteristics need to be sought for.

SUMMARY

Exemplary embodiments provide a display apparatus which is capable of utilizing a transparent display for various uses and a method thereof.

According to an aspect of an exemplary embodiment, there is provided display apparatus which may include: a transparent display; a scanner configured to scan an object seen through the transparent display, a position of the scanner being adjustable with respect to the transparent display; and a controller configured to provide information corresponding to the scanned object on the transparent display, in response to occurrence of a predetermined event.

Here, one end of the scanner may include a camera and another end of the scanner is connected to a hinge provided on one point of an outer area of the display apparatus such that a position of the camera is capable of being adjusted on the transparent display The scanner may comprises: a support of which one end includes a camera and another end is connected to a hinge provided on one point of an outer area of the display apparatus and which has a predetermined length; and, a hinge configured to be provided at the other end of the support to enable the support to move.

The display apparatus further comprises: a scanner holder configured to be provided on a side portion of the display apparatus and hold the scanner in response to the scanner not being used.

Here, the scanner may include: a camera configured to scan the object; and a sensor configured to sense brightness around the transparent display, wherein the controller is further configured to adjust at least one of a luminance value and a chrominance value of a selected area corresponding to the information provided on the transparent display or another area on the transparent display, based on the sensed brightness.

The scanner may further include an illumination unit which is configured to be turned on or off in response to the sensed brightness.

The controller may be further configured to adjust a position of the information to be displayed on the transparent display based on a position where the object is seen through the transparent display.

The controller may be further configured to adjust at least one of color, shape, luminance and size of the information to be displayed on the transparent display.

The scanner may be configured to be positioned in a front side or a rear side of the transparent display.

If the scanner is positioned in the rear side of the transparent display, the controller may configured to crop an image of an area, which is covered by the scanner and is not viewable to a user from the frond side, and display the cropped image on the transparent display to replace an image of the scanner seen through the transparent display.

The controller may be configured to decrease transparency of an area where the information is displayed on the transparent display.

The transparent display may include: a display panel including a plurality of pixels; and a switching panel including switching elements corresponding to the plurality of pixels, wherein the controller is configured to control an operation of the switching elements to distinguish transparency of pixels corresponding to the area where the information is displayed on the transparent display from transparency of pixels corresponding to an area where the object is seen through on the transparent display.

If a text in a foreign language is included in the scanned object, the controller may be configured to provide a translation of the text in the foreign language as the information on the transparent display.

According to an aspect of another exemplary embodiment, there is provided a method of controlling a display apparatus including a transparent display, a scanner and a controller. The method may include: controlling the scanner to scan an object which is seen through the transparent display by adjusting a position of the camera; and controlling the controller to provide information corresponding to the scanned object to the transparent display, in response to occurrence of a predetermined event.

The method may further include: controlling the scanner to sense brightness around the transparent display; and controlling the controller to adjust at least one of a luminance value and a chrominance value of a selected area corresponding to the information provided on the transparent display or another area on the transparent display, based on the sensed brightness.

The method may further include controlling the scanner to turn on or off an illumination unit included in the scanner in response to the sensed brightness.

The method may further include controlling the transparent display to display the information at a selected position on the transparent display based on a position where the object is seen through the transparent display.

The method may further include controlling the transparent display to display the information which is adjusted at least in one of color, shape, luminance and size.

The method may further include, if the scanner is positioned in the rear side of the transparent display, controlling the controller to crop an image of an area, which is covered by the scanner and is not viewable to a user from the frond side, and display the cropped image on the transparent display to replace an image of the scanner seen through the transparent display.

The method may further include controlling the controller to decrease transparency of an area where the information is displayed on the transparent display.

The predetermined event may be an event of entering into a scanning mode for scanning the object which is brought into contact with the transparent display.

According to an aspect of another exemplary embodiment, there is provided a non-transitory computer readable recording medium having recorded thereon a program for executing a method of controlling a display apparatus comprising a transparent display, a scanner and a controller, wherein the method may include: controlling the scanner to scan an object which is seen through the transparent display by adjusting a position of the camera, and controlling the controller to provide information corresponding to the scanned object to the transparent display, in response to occurrence of a predetermined event.

According to various exemplary embodiments shown above, the display apparatus including the transparent display can be utilized for various purposes, and thus can improve user satisfaction.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
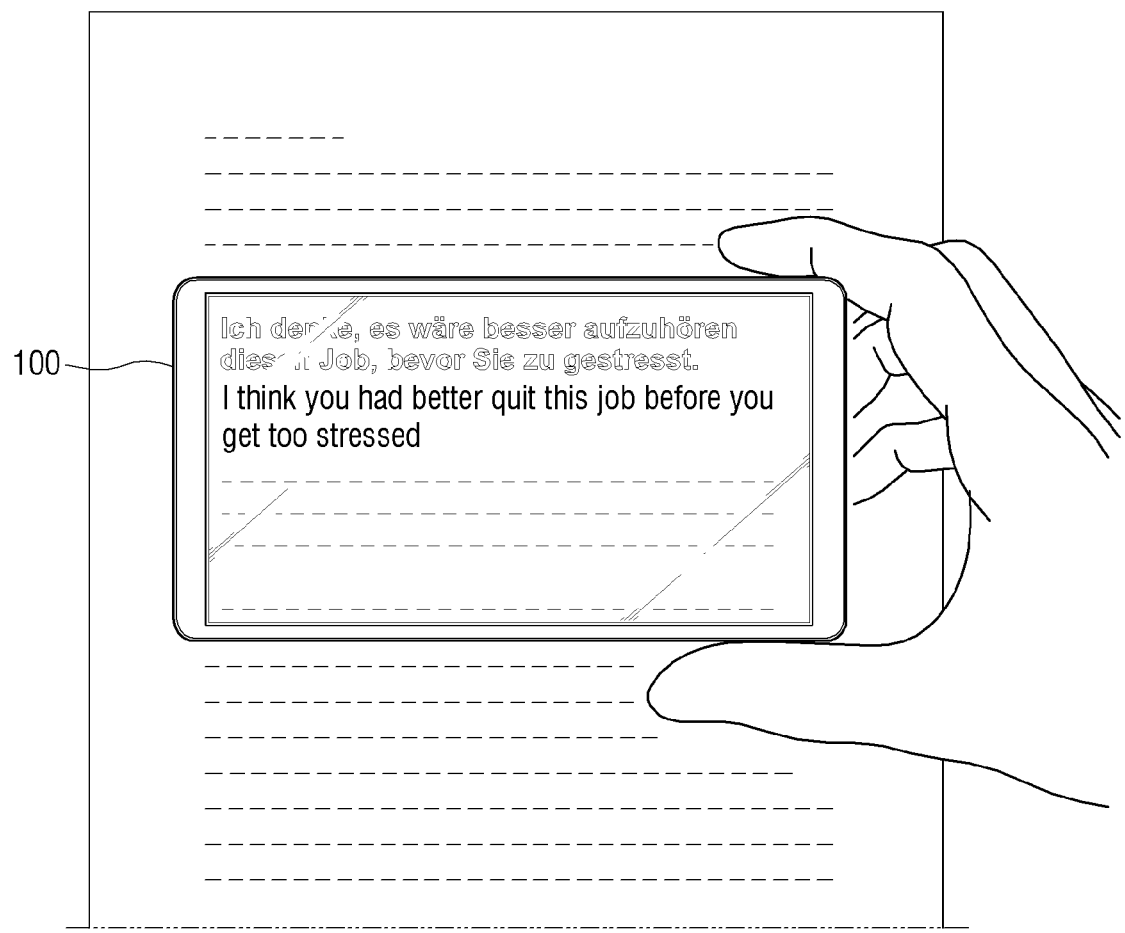
FIG. 1 is a view provided to explain an implementation example of a display apparatus according to an exemplary embodiment.

Hereinafter, exemplary embodiments will be described in detail with reference to the accompanying drawings.

In the following description, same reference numerals are used for same elements when they are depicted in different drawings. The matters defined in the description, such as detailed construction and elements, are provided to assist in a comprehensive understanding of exemplary embodiments. Thus, it is apparent that other embodiments can be carried out without those specifically defined matters. Also, functions or elements known in the related art are not described in detail since they would obscure the exemplary embodiments with unnecessary detail.

FIG. 1 is a view provided to explain an implementation example of a display apparatus according to an exemplary embodiment.

The display apparatus 100 may be a mobile terminal, and may be implemented in various forms, such as a cellphone, smartphone, portable medial player (PMP), personal digital assistant (PDA), laptop computer, etc.

Particularly, the display apparatus 100 may be configured such that a display screen is transparent, and thus makes the rear background of the display screen be seen through.

For instance, the display apparatus 100 may display information, with an object located in the rear of the display screen being seen through as in FIG. 1. In this case, the information to be displayed may be information related to the object located in the rear of the display screen.

Specifically, the display apparatus 100 may provide an augmented reality (AR) function of scanning an object located in the rear and providing information related to the object located in the rear based on the scanned image. Hereinafter, the exemplary embodiments will be explained more in detail with reference to drawings.

Figure 2A:
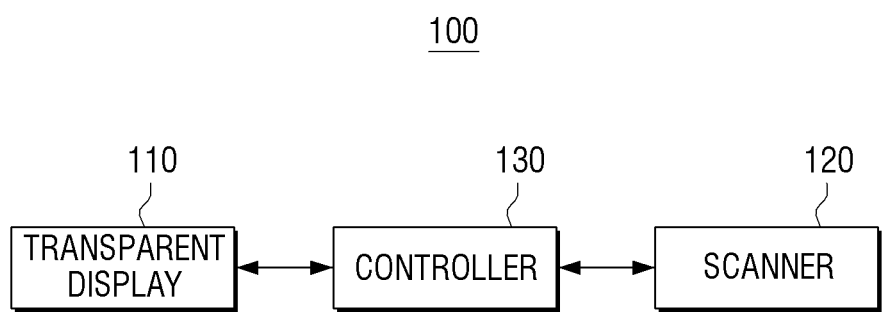
FIG. 2A is a block diagram illustrating a configuration of a display apparatus according to an exemplary embodiment.

FIG. 2A is a block diagram illustrating a configuration of a display apparatus according to an exemplary embodiment. Referring to FIG. 2A, the display apparatus 100 includes a transparent display 110, a scanner 120 and a controller 130.

The transparent display 110 displays information. Here, the information may be an image, a text, a content-replaying screen, an application execution screen, a web browser screen, various kinds of graphic objects, etc. Transparency of the transparent display 110 may vary not being limited to a fixed transparency value.

The transparent display 110 may be configured as various types, such as a transparent liquid crystal display (LCD) type, a transparent organic light-emitting diode (OLED), a transparent thin-film electroluminescent panel (TFEL) type, a projection type, etc. Hereinafter, various exemplary embodiments of a structure of the transparent display 110 will be explained.

The transparent LCD type includes a transparent display which is configured by removing a backlight unit from a currently used LCD device, and using a pair of polarizers, an optical film, a thin-film transistor (TFT), a transparent electrode, etc. The transparent LCD type has low transmissibility due to a polarizer or an optical film, and has low optical efficiency due to nearby light used instead of a backlight unit. However, the transparent LCD type may be configured as a large-sized transparent display. The transparent TEFL type includes a device which employs an alternating current-thin-film electroluminescent (AC-TEFL) display device which includes a transparent electrode, an inorganic fluorescent body, and an insulating layer. The AC-TFEL display device is a display which emits light when an accelerated electron passes through inside of the inorganic fluorescent body and excites the inorganic fluorescent body. When the transparent display 130 is configured as a transparent TEFL type, the controller 130 may determine a location in which information is displayed, by adjusting an electron to be projected to an appropriate location. Since the inorganic fluorescent body and the insulating layer have transparent characteristics, a very transparent display may be implemented.

In addition, the transparent OLED type includes a transparent display which employs an OLED which allows self-activated luminescence. Since an organic light-emitting layer is transparent, when a transparent electrode is used for electrodes at both sides of the organic light-emitting layer, the transparent OLED type may be configured as a transparent display. An OLED emits light when an electron and a hole are injected at both sides of the organic light-emitting layer, and thus combined in the organic light-emitting layer. By using this technique, a transparent OLED device displays information by injecting an electron and a hole to a desired location.

Figure 3:
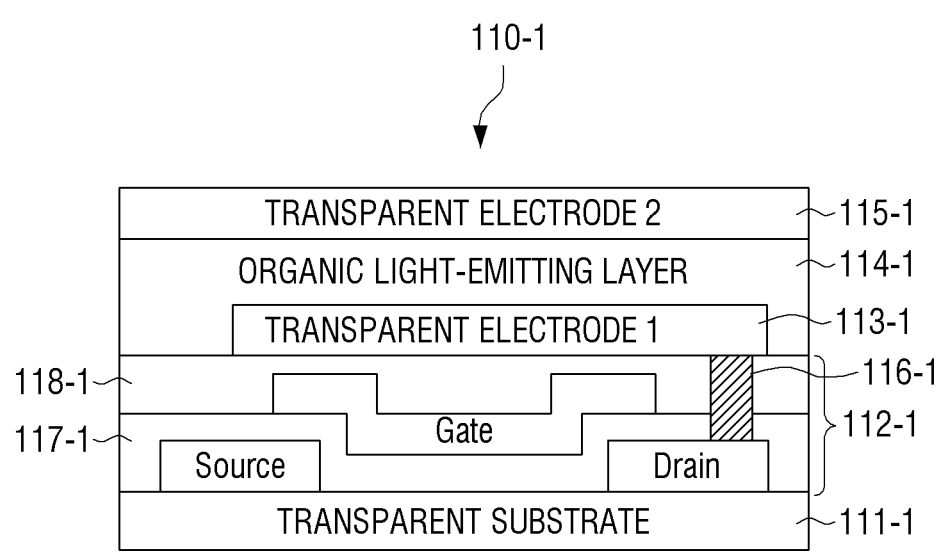
FIG. 3 is a view illustrating an example of detailed configuration of a transparent display which is implemented as a transparent organic light-emitting diode (OLED) type.

FIG. 3 is a drawing illustrating an example of detailed configuration of a transparent display which is implemented as a transparent OLED type. For the sake of convenience, a reference numeral 110-1 is assigned to a transparent display implemented as a transparent OLED type.

According to FIG. 3, the transparent display 110 includes a transparent substrate 111-1, a transparent transistor layer 112-2, a transparent electrode 1 113-1, a transparent organic light-emitting layer 114-1, a transparent electrode 2 115-1, and a connection electrode 116-1.

The transparent substrate 111-1 may be formed of a polymer material, such as plastic which has transparent characteristics, or may be formed of glass. A material of the transparent substrate 111-1 may be determined by an environment in which the transparent display 100 is applied. For example, since a polymer material is light and flexible, the polymer material may be used for a mobile display apparatus. Glass may be used for a show-window of a shop or a general window.

The transparent transistor layer 112-2 includes a transistor manufactured by replacing opaque silicon of an existing TFT with a transparent material such zinc oxide or titanium oxide (TiO). A source, a gate, a drain, and various dielectric layers 117-1 and 118-1 are provided in the transparent transistor layer 112-2. A connection electrode 116-1 for electrically connecting the drain to the transparent electrode 1 113-1 may also be provided in the transparent transistor layer 112-2. In FIG. 3, only one transistor, which is formed of the source, the gate, and the drain in the transparent transistor layer 112-1, is illustrated. However, practically, a plurality of transparent transistors, which are distributed over an entire area on a surface of the display, are provided. The controller 130 may display information by applying a control signal to a gate of the respective transistors inside the transparent transistor layer 112-2, and driving the corresponding transparent transistor.

The transparent electrode 1 113-1 and the transparent electrode 2 115-1 are disposed in an opposite direction from each other, with the transparent organic light-emitting layer 114-1 therebetween. The transparent electrode 1, the transparent organic light-emitting layer, and the transparent electrodes 2 113-1, 114-1, and 115-1 form a transparent OLED.

The transparent OLED may be classified into a passive matrix OLED (PMOLED) and an active matrix OLED (AMOLED), according to a driving method. With regard to the PMOLED, a pixel is formed in an area in which the transparent electrodes 1 and 2 113-1 and 115-1 cross each other. On the contrary, the AMOLED has a structure which includes a TFT which drives each pixel. FIG. 3 illustrates a structure of the AMOLED.

The transparent electrode 1 113-1 and the transparent electrode 2 115-1 respectively include a plurality of line electrodes. The plurality of line electrodes are aligned vertically with each other. For example, if lines electrodes of the transparent electrode 1 113-1 are arranged in a horizontal direction, line electrodes of the transparent electrode 2 115-1 are arranged in a vertical direction. Thus, a plurality of crossing areas are formed between the transparent electrode 1 113-1 and the transparent electrode 2 115-1. A transparent transistor, as illustrated in FIG. 3, is connected to the respective crossing areas.

The controller 130 may use the transparent transistor to form a potential difference for each crossing area. In the crossing area in which a potential difference is formed, an electron and a hole, from each electrode, flow to and are combined in the transparent organic light-emitting layer 114-1, thus emitting light. On the contrary, in a crossing area where a potential difference is not formed, light is not emitted. Thus, a rear background is transparently seen.

The transparent electrodes 1 and 2 113-1 and 115-1 may be formed of indium tin oxide (ITO) or a new material such as graphene. Graphene is a transparent material formed of carbon atoms which are connected to each other and form a planar structure shaped like a hive. Additionally, the transparent organic light-emitting layer 114-1 may also be configured by using various materials.

As described above, the transparent display 110 may be implemented as various types such as a transparent LCD type, a transparent TFEL type, a transparent OLED type, or a transmissive type. In a case of the transmissive type, like a head-up display (HUD), an image is projected and displayed on a transparent screen.

Referring back to FIG. 2A, the scanner 120 photographs an object located in the rear of the transparent display 100 and generates scan information.

Specifically, one end of the scanner 120 is configured to include a camera and another end of the scanner 120 is configured to be connected to a hinge provided on one point of an outer area of the display apparatus such that a position of the camera is adjustable on the transparent display. The camera may be implemented as a common mobile camera, but is not limited thereto. Also, the camera may be implemented in various forms such as a subminiature camera which allows depth sensing, a camera in a form where an infrared (IR) depth sensing module is added to a common image camera, etc.

Particularly, the scanner 120 may be configured to include a support of which one end includes a camera and another end is connected to a hinge provided on one point of an outer area of the display apparatus 100 and which has a predetermined length, and a hinge configured to be provided at the other end of the support to enable the support to move.

The scanner 120 may further include at least one light source (e.g., LED) and a lighting unit (not illustrated) such as various kinds of lenses which provides an exterior light to a transparent display.

The scanner 120 may be configured such that the camera can be positioned to be in the front side or in the rear side of the transparent display 110, i.e., in the front side or in the rear side with respect to the display apparatus 100. How the scanner 120 is configured will be explained in further detail with reference to the drawings.

The controller 130 controls overall operations of the display apparatus 100.

Specifically, the controller 130, when an object which is seen through the transparent display 100 is scanned by the scanner 120 according to a predetermined event, may provide an AR function which provides information corresponding to the object based on the scanned image.

Here, the predetermined event may be an event of entering into a scanning mode for scanning the object which is brought into contact with the transparent display. For instance, the predetermined event may be an event where a user brings the display apparatus 100 into contact with a document, etc. in order to use the display apparatus 100 for a scanning purpose. In this case, a proximity sensor and a contact sensor can be used for detecting such an event. Or, the predetermined event may be an event of pressing a particular button for entering into the scanning mode, or be a voice command, a motion command, etc. The predetermined event may be an event where a user manually manipulates the scanner 120 for a scanning operation.

Meanwhile, information about the object may be provided in various forms such as a map, a relevant website address, relevant image, a relevant text, advertisement content, etc. according to a type of the object included in a scanned image. For instance, the controller 130 may provide, when the scanned image includes a text in a foreign language, a translation on the foreign text as the information about the object.

Meanwhile, the controller 130 may control the information about the object to be more distinctive on the transparent display 110 by decreasing transparency of an area where the information is displayed. For instance, the controller 130 may switch polarization elements of the area to be displayed in order to make display characteristics of the area be improved, which is merely an exemplary embodiment of the present inventive concept. Various methods may be used to improve the display characteristics by reducing the transparency of the area on which the information is displayed.

For instance, the transparent display 110 may be configured to include a display panel which includes a plurality of pixels and a switching panel which includes switching elements corresponding to the plurality of pixels. In this case, the controller 130 may control an operation of the switching elements to display an image by decreasing transparency of pixels corresponding to an area where the information is displayed and to make an object be seen through pixels corresponding to the other areas.

In this case, the operation may be implemented based on at least one of a microelectromechanical systems (MEMS) technique, an electrowetting technique, an electrical color modulation technique and a polarization switching technique. The switching panel can also be configured such that the above described techniques can be applied. Detailed implementation formats and operations of the transparent display 110 will be explained below with reference to drawings.

When a camera included in the scanner 120 is arranged in a particular position with respect to the transparent display 110, the controller 130 may map the position of the camera to a position coordinate of the transparent display 110 by means of angle of view and depth sensing, and when the angle of view does not correspond to the transparent display 110, the transparent display 110 may display information indicating that the angle of view does not correspond to the transparent display 110.

For instance, when a central part of the camera corresponds to a position coordinate of the transparent display 110 but an angle of view is small, the controller 130 may adjust the transparent display 110 area except for the scope of the angle of view to be opaque to increase consentience of a user's eyes. When the angle of view is distorted and thus the up down left right side are different, the controller may display information indicating that the up down left right side are different or adjust the area of the transparent display area within the angle of view to be opaque.

Although not illustrated, the display apparatus 100 may further include a scanner holder (not illustrated) which is provided on a side portion of the display apparatus 100 to hold the scanner when the scanner 120 is not used.

Figure 2B:
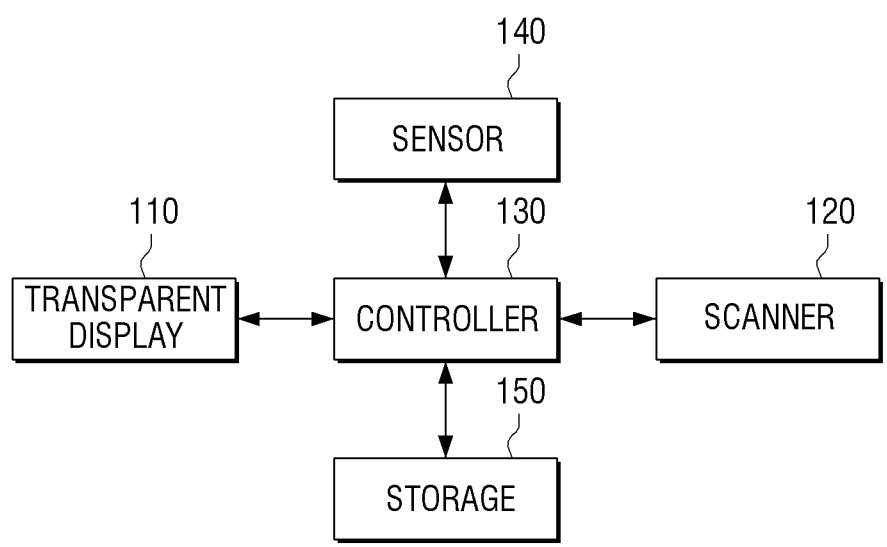
FIG. 2B is a block diagram illustrating a configuration of a display apparatus according to another exemplary embodiment.

FIG. 2B is a block diagram illustrating a configuration of a display apparatus according to another exemplary embodiment. According to FIG. 2B, the display apparatus 100 includes the transparent display 110, the scanner 120, the controller 130, a sensor 140 and a storage 150.

Detailed explanation on elements that are the same as those illustrated in FIG. 2A among the elements illustrated in FIG. 2B will be omitted.

The sensor 140 senses information about intensity of illumination or brightness and background information. Here, the background information about surroundings of the transparent display 110 may include information about an object located in a particular direction with respect to the transparent display 110. Accordingly, the sensor 140 may be implemented as an illumination sensor, an imaging sensor which is capable of depth sensing, etc. Here, various kinds of photoelectric cells may be used as an illumination sensor. But, in case of measuring a very low illumination, a photoelectric tube can be used.

In this case, the controller 130 may control an operation state of a camera included in the scanner 120, an operation state such as a case where an illumination unit or a light source included in the scanner 120 is turned on/off, etc. based on the information sensed by the sensor 140. For instance, when the sensed information indicates an illumination value greater than a predetermined value, the controller 130 may control the illumination unit of the scanner 120 to be turned off.

The controller 130 may adjust at least one of a luminance value or a chrominance value of pixel areas corresponding to the information displayed on the transparent display 110 based on the sensed information about illumination. For instance, when illumination in both the front and the rear of the transparent display 100 is high, and thus the information displayed is not recognized easily, the controller 130 may decrease the luminance of a pixel area which corresponds to the displayed information in order to make the displayed information to be recognized clearly.

In addition, the controller 130 may adjust where the displayed information is displayed on the transparent display 110 based on the background information sensed by the sensor 140. For instance, in a case where an object located in the rear of the display apparatus 100 is seen through when information is displayed, how the information is displayed may be changed based on a position where the object is seen from the viewpoint of the user, a shape and a color of the object, etc. Here, the object has a specified figure, and thus may be various things, such as a product that can be purchased, animals and plants, wall, and wallpaper.

For instance, the sensor 140 may photograph a rear background image using an image device such as a camera and analyze the photographed rear background image in order to recognize a property of an object included in the rear background image, e.g., color of the object, a text which is written on the object, image which is drawn on or attached to the object. In case of color of the object, edge detection may be performed from an image photographed by the camera, and color of an inside of the detected edge may be detected. A text and image may be detected from the image photographed by the camera, through using a text-reading or image-reading algorithm. When such a color, text, image, etc. are detected, the sensor 140 may provide information about the object to the controller 130.

In addition, the sensor 140 may also detect an average color in the rear background through the photographed image. For instance, when the background which is transparently seen through the transparent display 110 has various colors, the sensor 140 may detect an average of the various colors.

According to another exemplary embodiment, however, the foregoing functions and operations of the sensor 140 may be performed by the scanner 120 which may also include a camera and a sensor which are similar to the sensor 140.

The controller 130 may adjust color, luminance, size etc. of the information displayed on the transparent display, based on the sensed shape and color of the rear background, the shape and color of an object included in the rear background, etc.

The storage 150 may store information on a scanned image and a position of an object in the image obtained by the scanner 120 and the sensor 140, other various information, various kinds of setting information set by a user with respect to an operation of the display apparatus 100, system operating software, various kinds of application programs, etc.

A user interface (not illustrated) is a part for receiving various user instructions with respect to the operation of the display apparatus 100. The user interface (not illustrated) may be configured as various types such as a touch screen on the display 100, various buttons included in the main body, an input/output (I/O) interface which receives various kinds of input signal from an external input means such as a keyboard, mouse, etc. A user may turn on and off the scanning function, function of moving the location where information is indicated and set a condition for moving the location where information is indicated, a method for adjusting display characteristics at the time of movement, etc. through the user interface.

Figure 4A:
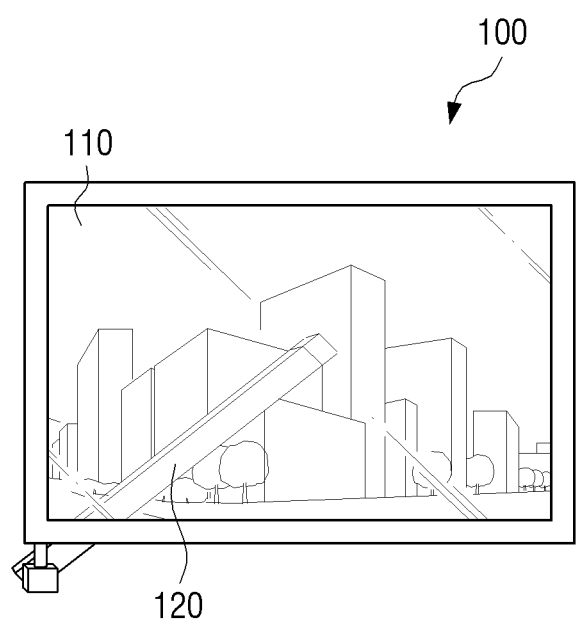
FIGS. 4A and 4B illustrate an implementation example of a display apparatus according to an exemplary embodiment.
Figure 4B:
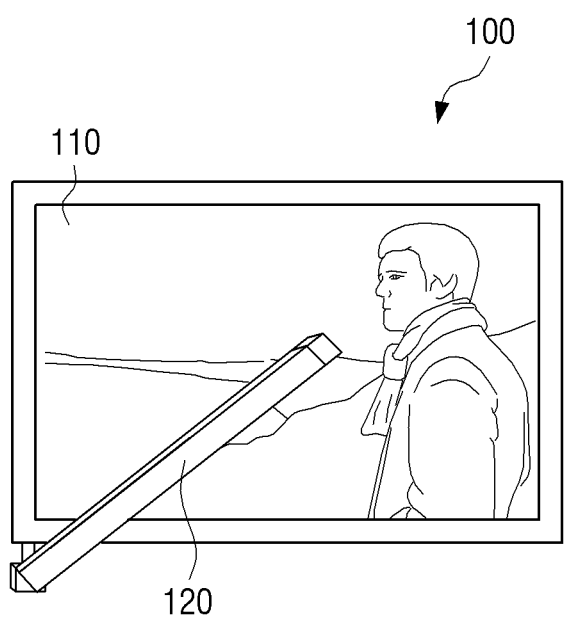

FIGS. 4A and 4B illustrate an implementation example of a display apparatus, according to an exemplary embodiment.

As illustrated in FIGS. 4A and 4B, the display apparatus 100 may be configured to include the transparent display 110 and the scanner 120 performing a function of scanning an image which is seen through the transparent display.

FIG. 4A illustrates a case where the scanner 120 is arranged in the rear side of the transparent display 110 i.e., a case where the scanner 120 is arranged in the side where a user is not located with respect to the display apparatus 100, and FIG. 4B illustrates a case where the scanner 120 is arranged in the front side of the transparent display 110 i.e., the scanner 120 is arranged in the side where a user is located with respect to the display apparatus 100.

As illustrated in FIG. 4A, when the scanner 120 which is connected to the scanner holder located on a side of the display apparatus 100 is arranged in the read side of the transparent display 110, the scanner may be used for an AR purpose or a common camera purpose, and as illustrated in FIG. 4B, the scanner 120 which is connected to the scanner holder 1 is arranged in the front side of the transparent display 110, the scanner may be used for a scanning purpose.

Figure 5A:
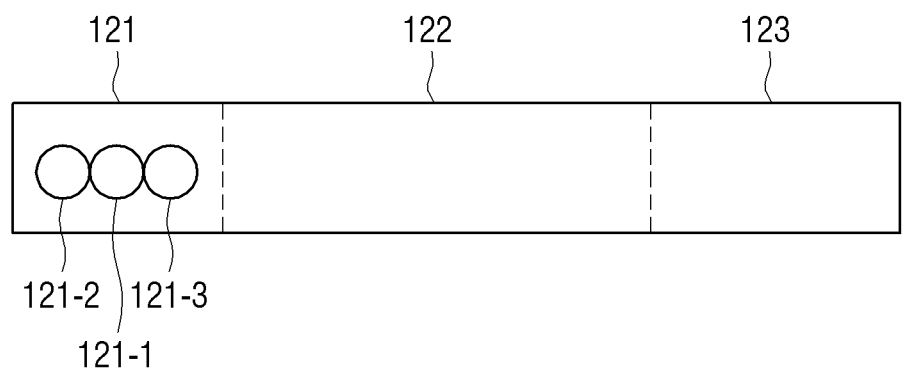
FIGS. 5A to 5C illustrate a structure of a scanner according to an exemplary embodiment.
Figure 5B:
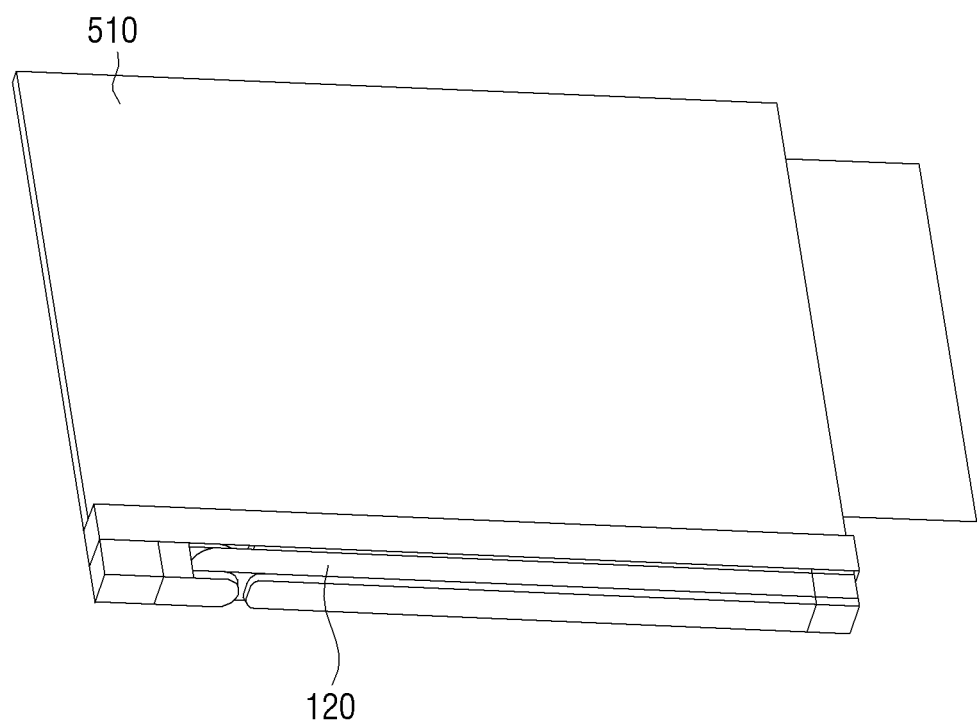
Figure 5C:
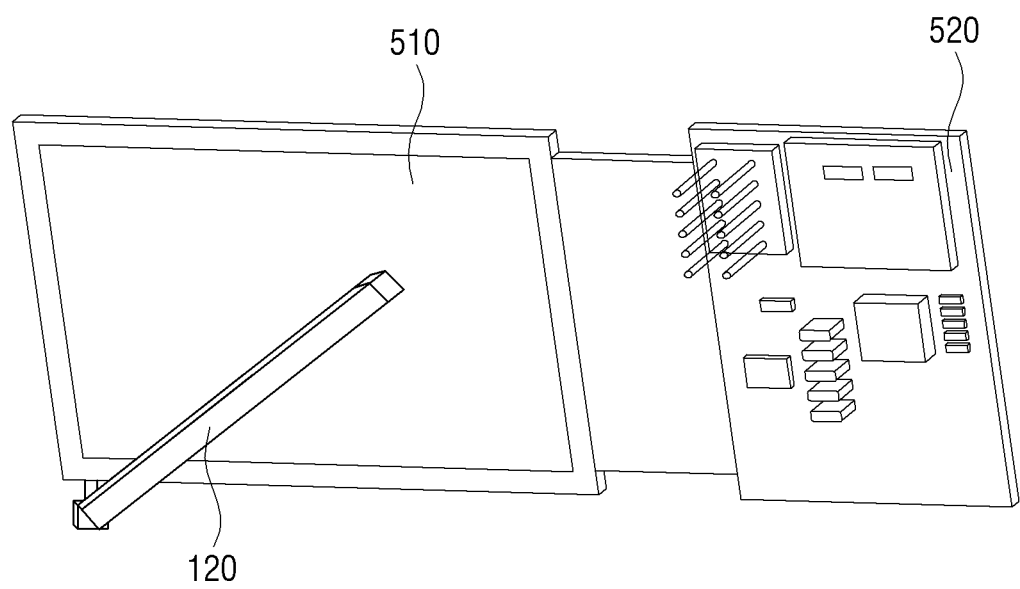

FIGS. 5A to 5C illustrate a structure of a scanner, according to an exemplary embodiment.

As illustrated in FIG. 5A, the scanner 120 may be configured to include a part 1 121 including a camera, a part 2 122 for adjusting distance and a depth, and a part 3 123 for adjusting a rotation and an angle of the scanner 120.

The part 1 121 may be configured to include a lens array which includes a camera 121-1 and depth sensors 121-2, 121-3. Here, the depth sensors 121-2, 121-3 may be configured to include an IR light-emitting sensor and an IR light-receiving sensor for sensing a depth of an object. However, any sensor capable of sensing a depth may be applied thereto. The part 1 121 may be configured to allow rotation such that scanning (photographing) in a desired direction may be performed.

The part 2 122 may be configured to have a long arm such that a photographing distance and depth can be adjusted.

The part 3 123 may be configured to perform rotation and angle adjustment of the whole arm part of the scanner.

As illustrated in FIG. 5B, the scanner 120 may be configured to be attached to a base panel 510, and the base panel 510 may be configured to be attached to various user terminal apparatuses. In this case, the scanner 120 may be configured to be fixed to a scanner holder when not used.

As illustrated in FIG. 5C, a circuit panel 520 for controlling a function of a user terminal apparatus may be configured to be attached to the base panel 510.

Figure 6A:
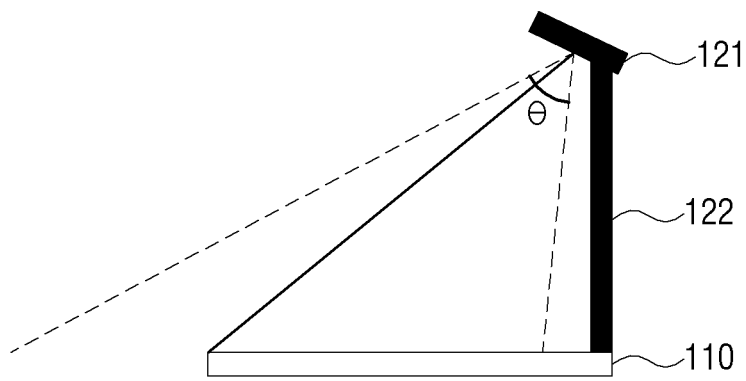
FIGS. 6A and 6B illustrates a method of adjusting an angle of view of a camera of a scanner, according to an exemplary embodiment.
Figure 6B:
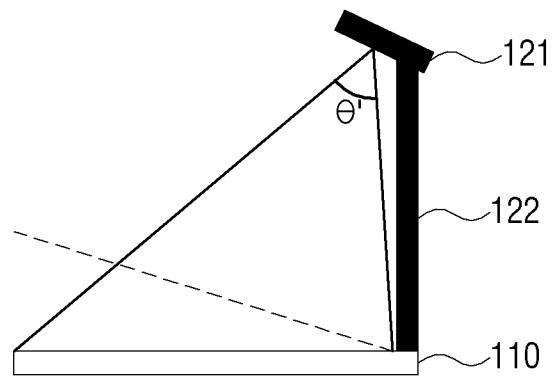

FIGS. 6A and 6B illustrate a method of adjusting an angle of view of a camera of a scanner, according to an exemplary embodiment.

Generally, a transparent display 110 area and an area where an object is seen through the transparent display 110 area correspond to each other, and thus there is no need for additional control for increasing consentience of a user's eyes. However, an angle of view depending on a camera location needs a delicate control.

For instance, as illustrated in FIG. 6A, the scanner's arm part 122 should be located to cover a user's view through the transparent display 110 as little as possible, and thus a problem of inconsistency of an angle of view (θ) and asymmetry may occur. An area of an object may be made to correspond to the transparent display 110 area by performing optimization through controlling the height of the arm part 122 and the angle of the camera part 121 and then by using the angle information about an inconsistent angle of view to compensate an image by means of signal processing.

For instance, when the arm part 122 which is in a scanning mode is separated to be raised and is made to operate at a predetermined angle, the camera part 121 may recognize an area of the transparent display 110 and transmit the recognized information to the controller 130, and the controller 130 may calculate an optimized angle depending on a distance and adjust an angle of the uppermost end of the camera part 121.

Then, when an optimized view of angle (θ') is set, the controller 130 may determine an amount of image correction and control a controlled image to be displayed on the transparent display 110, thereby achieving an optimized consentience of a user's eyes. In this case, when there is an input such as a touch on the transparent display 110, the controller 130 may perform a control operation which corresponds to the position where the touch is input.

FIGS. 7A to 7D illustrate a method of operating the display apparatus, according to an exemplary embodiment.

In case where a camera is moved from a side portion to the rear side of the transparent display 110 according to an AR use, when the camera is located in the center of the transparent display 110, an effective state may be created, for example, such that consentience of a user's eyes can be achieved, which leads the scanner 120 to cover an object from the viewer's viewpoint. In this case, the controller 130 recognizes the object area which is covered and crops the recognized area, thereby controlling a compensated image to be displayed on the transparent display 110.

Figure 7A:
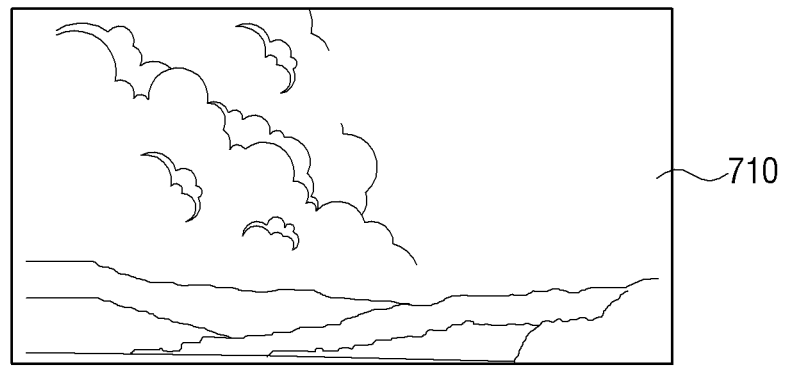
FIGS. 7A to 7D illustrate a method of operating a display apparatus, according to an exemplary embodiment.
Figure 7B:
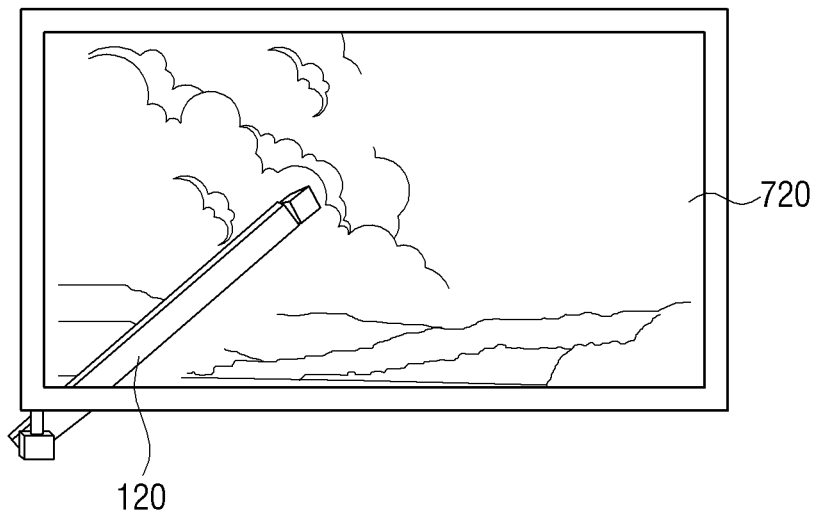

Specifically, FIG. 7A illustrates an image 710 of the rear side of the transparent display 110 which is photographed by a camera of the scanner 120, and FIG. 7B illustrates an image 720 viewed in the transparent display 110 from a viewpoint of a user when no particular image processing is performed.

That is, when no particular image processing is performed, in case where an object is seen through the transparent display 110, the image 720 that can be seen from the view's viewpoint may be covered by the scanner 120, as illustrated by FIG. 7B.

Figure 7C:
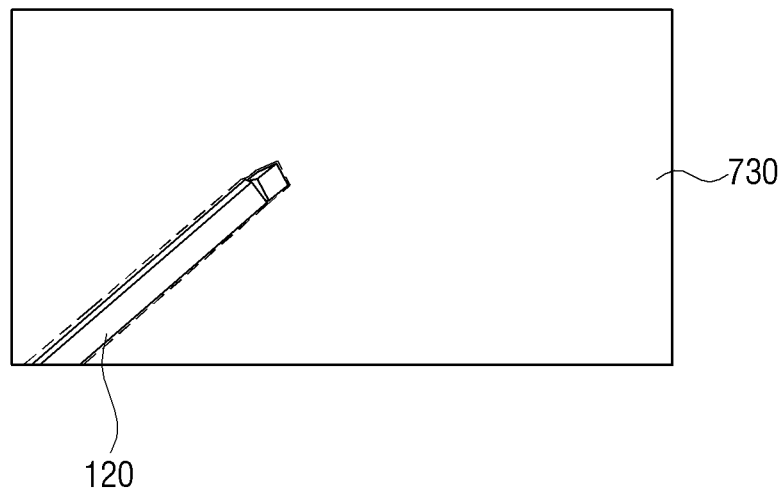
Figure 7D:
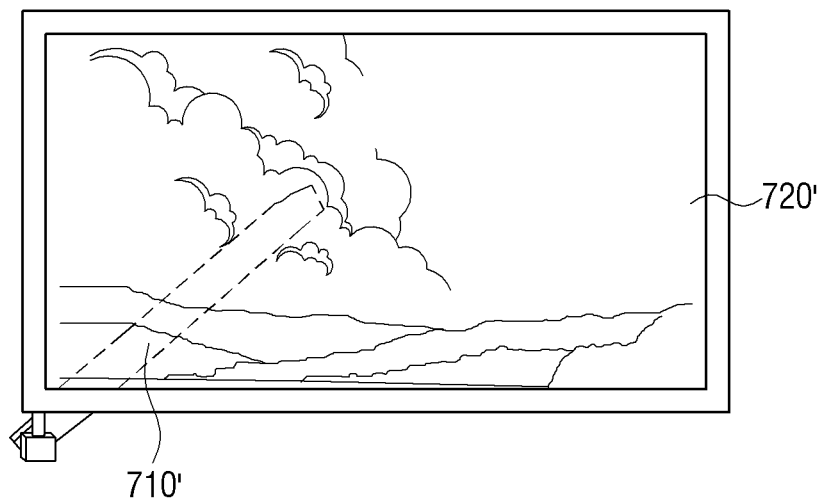

Accordingly, as illustrated in FIG. 7C, the controller 130 may discern an area which is covered by the scanner 120 in an area 730, and as illustrated in FIG. 7D, may perform image processing on an image 710' which corresponds to an area which is covered by the scanner 120 among the camera-photographed image. That is, the camera is photographing an image 720' of the rear in real time, and thus the controller 130 may image-process and then display only the area which is covered by the scanner 120 by mapping a position of the transparent display 110 to the area covered by the scanner 120.

Consequently, a user may be allowed to perceive that a perfect image that is not covered by the scanner 120 from a user's viewpoint is seen through the transparent display 110.

FIGS. 8A to 9B illustrate a structure and an operation of a transparent display, according to exemplary embodiments.

Figure 8A:
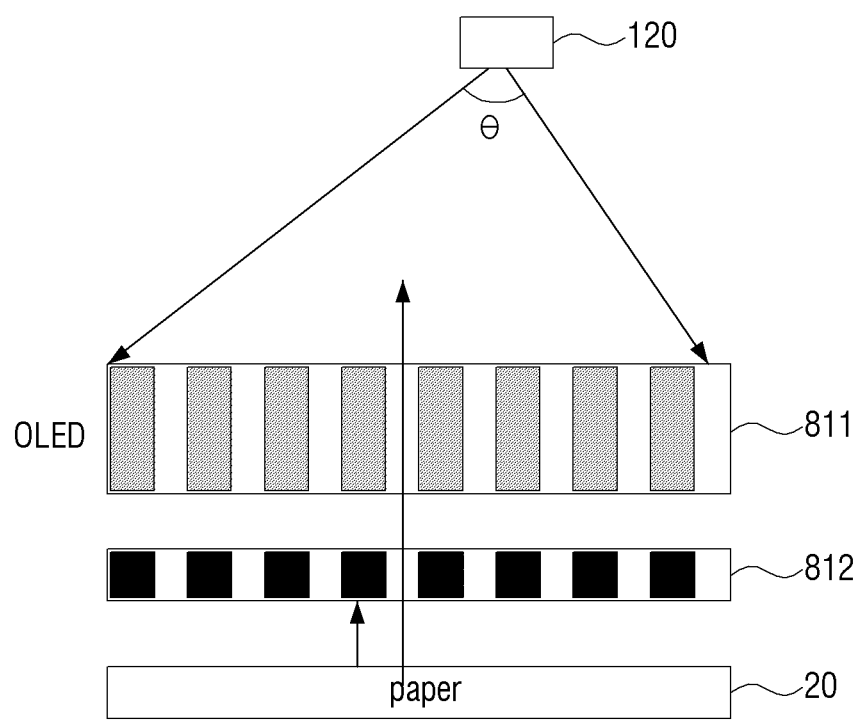
FIGS. 8A to 9B illustrate a structure and an operation of a transparent display, according to exemplary embodiments.

The transparent display 110 according to an exemplary embodiment illustrated in FIG. 8A includes a transparent display panel 811 and a switching panel 812. The transparent display 110 also includes the scanner 120.

The transparent display panel 811 may be configured as self-emitting elements, e.g., OLED elements.

In this case, the switching panel 812 is formed of switchable grids, and thus may be configured to illuminate light in a direction where an object 20 to be scanned, i.e., paper, is located and increase luminance in a direction of the display panel 811. That is, switchable grids may be configured to be capable of being divided in the same way as pixels are divided such that an illumination area and a display area can be discerned. For instance, in case where an object to be scanned by the scanner 120 includes a text, only an area where the text exists may be made to be illuminated and display characteristics may be made to be improved for an area where the text does not exist.

For instance, when there is a text in an image surface, only an area where the text exists may be controlled to be brighter, and the display characteristics may be made to be improved for an area where the text does not exist in order to display a translated text or image. In this case, switchable grids may operate in a reflection mode or an absorption mode (black mode) depending on a use of the switchable grids.

Specifically, the controller may operate such that OLED elements in an absorption mode area, i.e., a black area, displays an image and OLED elements in an reflection mode area, i.e., a transparent area, makes an object be seen through, by using at least one of a MEMS technique, an electrowetting technique and an electrical color modulation technique which allows electrical switching by some area unit or pixel unit.

Figure 8B:
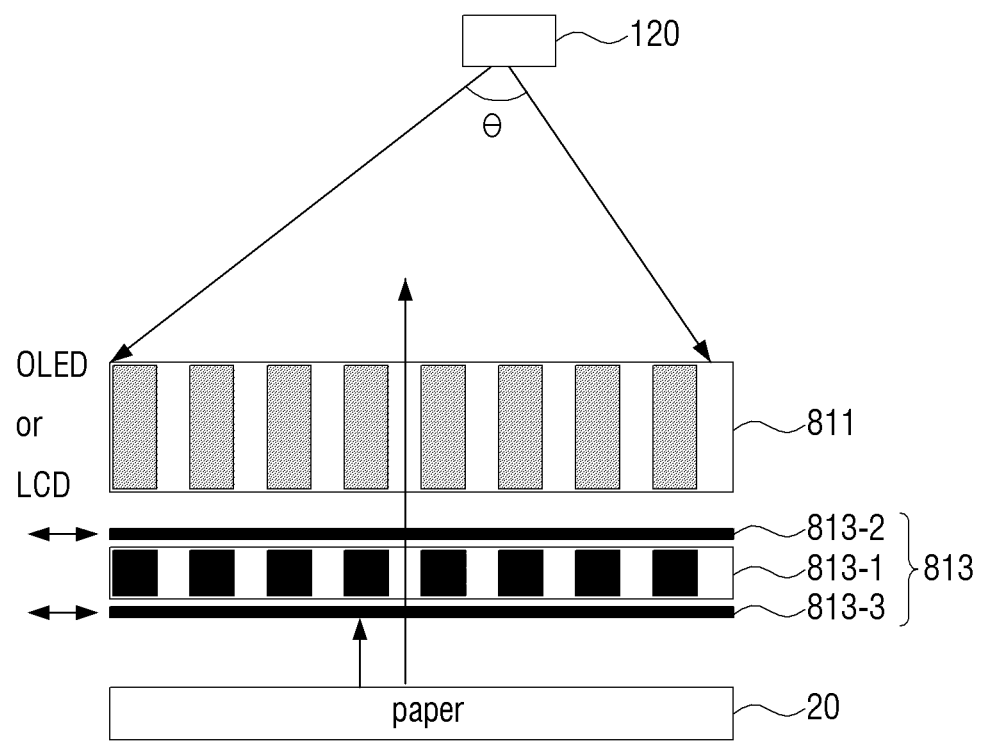

FIG. 8B illustrates an operation of a transparent display 110 according to another exemplary embodiment. Here, the transparent display 110 is configured as an OLED or LCD.

As illustrated in FIG. 8B, a switching panel 813 which uses a polarized light technology may be arranged below a transparent display panel 811, e.g., a transparent OLED panel or a transparent LCD panel. For instance, the switching panel 813 may be configured to include polarization switching elements, e.g., a polarization switching (PS) panel 813-1 which electrically change polarization components, which are interposed between two polarization sheets 813-2, 813-3.

Figure 9A:
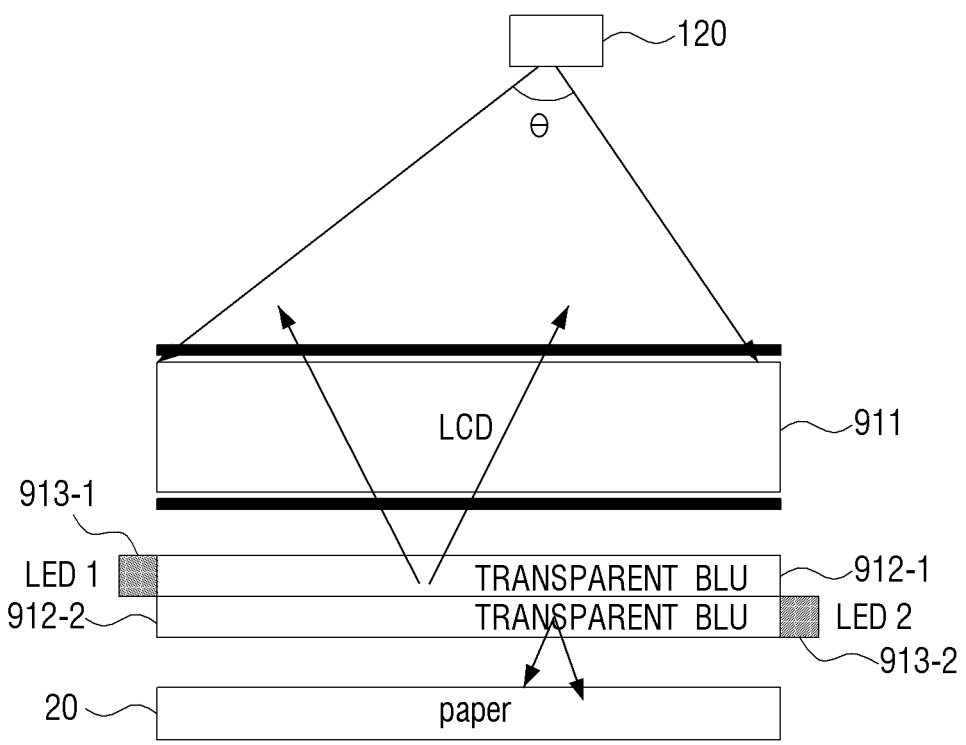
Figure 9B:
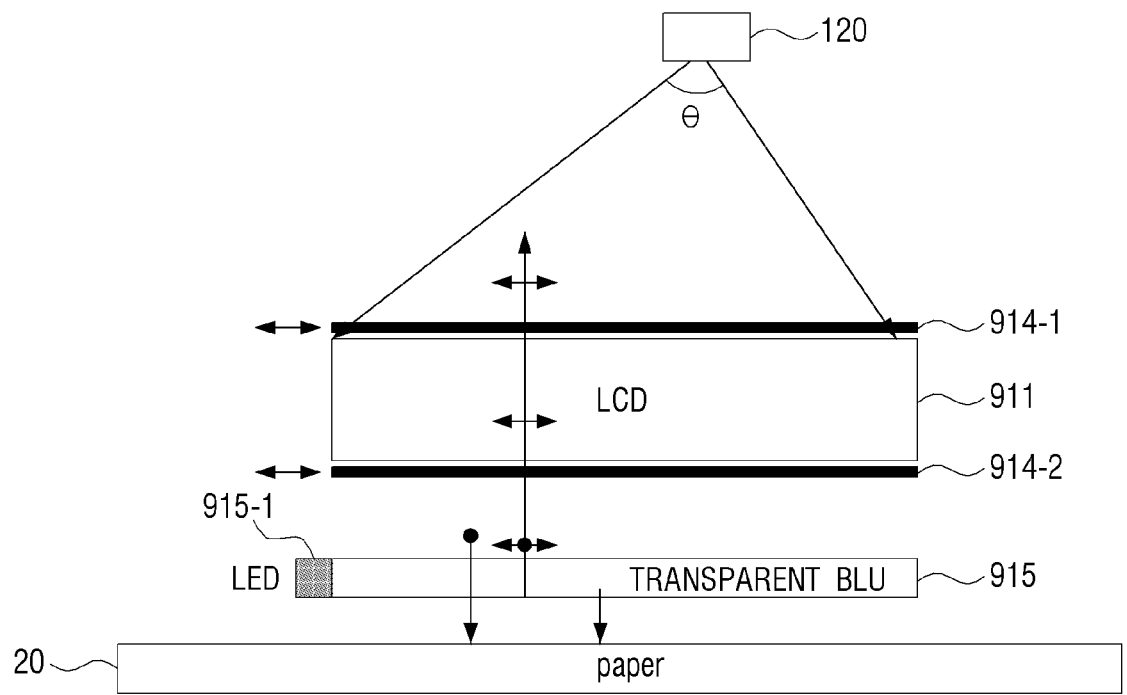

FIGS. 9A and 9B illustrate an operation of a transparent display 100 according to another exemplary embodiment. Here, the transparent display 100 includes a transparent LCD panel.

As illustrated in FIG. 9A, a light for activating a transparent LCD panel 911 and a light for illumination may be switched. For instance, a transparent backlight unit (BLU) 1 912-1 which can convert an illumination direction toward the transparent LCD panel 911 and a transparent BLU 2 912-1 which can convert an illumination direction toward an object may be included such that the transparent BLU 1 912-1 and the transparent BLU 2 912-1 may be switched or used simultaneously depending on their uses.

An LED 1 913-1 and an LED 2 913-2 which are used for respectively differentiating the operations of the transparent BLU 1 912-1 and the transparent BLU 2 912-2 may operate together with the transparent BLU 1 912-1 and the transparent BLU 2 912-2.

In this case, the transparent BLU 1 912-1 and the transparent BLU 2 912-2 may include a micro prism or a lens on the upper or lower end thereon, and thus may be used for activating the transparent LCD panel 911 by converting the optical path of the transparent BLU 1 912-1 at the time of light-emitting of the LED 1 913-1, or may be used for illuminating an object 20, e.g., paper, by converting the optical path of the transparent BLU 2 913-2 at the time of light-emitting of the LED 913-2.

As illustrated in FIG. 9B, by using one BLU 915, a light for activating a transparent LCD panel 911 and a light for illumination may be switched. For instance, the lower end or upper end of a transparent BLU 915 is in a form of micropattern, micro prism or lens, and thus transparent BLU 915 may be used for activating a transparent LCD panel 911 by converting the optical path of the transparent BLU 915 at the time of light-emitting of the transparent BLU 915-1, or may be used for illuminating an object 20, e.g., paper, by making an opposite polarizing light component of a reflection-type polarization film 914-2 on the lower part of the transparent LCD panel 911, which is not a linear polarizing light, be reflected and then go through a transparent BLU 915.

Figure 10:
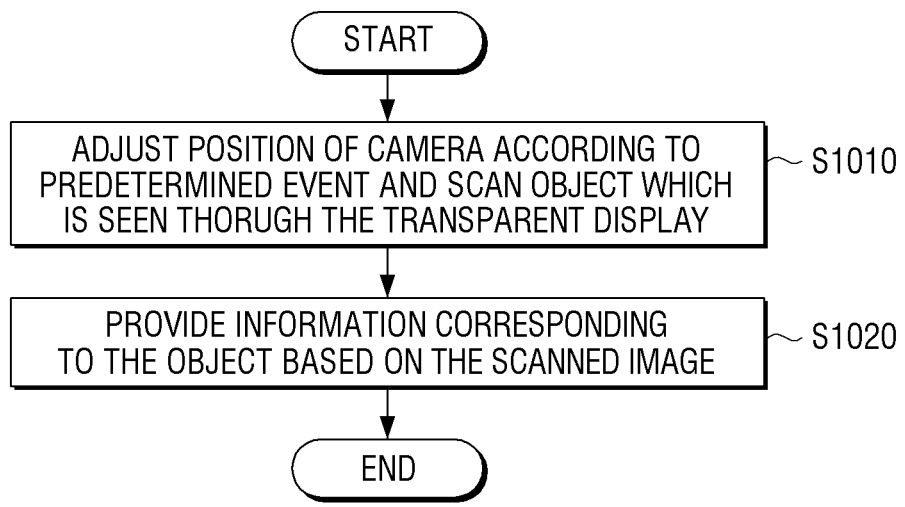
FIG. 10 illustrates an operation of a display apparatus, according to an exemplary embodiment.

FIG. 10 illustrates an operation of a display apparatus, according to an exemplary embodiment.

A display apparatus according to an exemplary embodiment may include a transparent display and a scanner of which one end includes a camera and another end is connected to a hinge provided on one point of an outer area of the display apparatus such that a position of the camera is adjustable on the transparent display.

According to a method of controlling a display apparatus according to an exemplary embodiment as illustrated in FIG. 10, a position of the camera included in the scanner is adjusted according to a predetermined event and an object which is seen through the transparent display is scanned (S1010). Here, the predetermined event may be an event of entering into a scanning mode for scanning an object which is brought into contact with the transparent display.

Then, based on a scanned image, information corresponding to the object is provided (S1020).

In this case, the scanner may include a support of which one end includes a camera and another end is connected to a hinge provided on one point of an outer area of the display apparatus and which has a predetermined length and a hinge provided at the other end of the support to enable the support to move.

The scanner may be implemented to be adjusted to be positioned in a front side or a rear side of the transparent display according to use of the camera.

When the scanner is positioned in the rear side of the transparent display, the controlling method of the display apparatus may include cropping an image area which is covered by the support and is not viewable to a user and displaying the cropped image area on the transparent display.

In S1020 where the information corresponding to the object is provided, the information may be controlled to be more distinctive on the transparent display by decreasing transparency of an area where the information is displayed.

In this case, the transparent display includes a display panel including a plurality of pixels; and a switching panel including switching elements corresponding to the plurality of pixels. In S1020 where the information corresponding to the object is provided, an operation of the switching elements may be controlled to display an image by decreasing transparency of the pixels corresponding to an area where the information is displayed and make an object be seen through the pixels corresponding to the other areas.

Here, the switching panel is implemented based on at least one of a MEMS technique, an electrowetting technique, an electrical color modulation technique and a polarization switching technique.

In S1020 where information is provided, when a text in a foreign language is included in a scanned image, the controller may provide a translation of the text in the foreign language as the information.

According to various exemplary embodiments described above, a display apparatus including a transparent display can be utilized for various purposes, and thus can improve user satisfaction.

The foregoing embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A display apparatus, comprising:
a transparent display;
a scanner which includes a camera at one end, and is connected to a hinge provided on an outer area of the display apparatus at another end such that a position of the camera is adjustable with respect to the transparent display; and
a processor configured to, in response to scanning an object seen through the transparent display according to a predetermined event, provide information corresponding to the scanned object on the transparent display,
wherein if the scanner is positioned to be overlapped with a partial area of the transparent display in a rear side of the transparent display, the scanner performs an augmented reality (AR) function or a camera function, and if the scanner is positioned to be overlapped with a partial area of the transparent display in a front side of the transparent display, the scanner performs a scanning function of scanning the object seen through the transparent display, and
wherein the scanner comprises a support of a predetermined length to be overlapped with the partial area of the transparent display, and the hinge is configured to enable the support to move.

2. The apparatus of claim 1, further comprising a scanner holder configured to be provided on a side portion of the display apparatus and hold the scanner in response to the scanner not being used.

3. The apparatus of claim 1, wherein the scanner further comprises
a sensor configured to sense brightness around the transparent display,
wherein the processor is further configured to adjust at least one of a luminance value and a chrominance value of a selected area corresponding to the information provided on the transparent display or another area on the transparent display, based on the sensed brightness.

4. The apparatus of claim 3, wherein the scanner further comprises an illumination unit which is configured to be turned on or off in response to the sensed brightness.

5. The apparatus of claim 4, wherein the transparent display comprises:
a display panel including a plurality of pixels; and
a switching panel including switching elements corresponding to the plurality of pixels,
wherein the processor is configured to control an operation of the switching elements to distinguish transparency of pixels corresponding to the area where the information is displayed on the transparent display from transparency of pixels corresponding to an area where the object is scanned through on the transparent display.

6. The apparatus of claim 1, wherein the scanner is configured to be positioned in the front side or the rear side of the transparent display.

7. The apparatus of claim 6, wherein if the scanner is positioned in the rear side of the transparent display, the processor is configured to crop an image of an area, which is covered by the scanner and is not viewable to a user from the front side, and display the cropped image on the transparent display to replace an image of the scanner scanned through the transparent display.

8. The apparatus of claim 1, wherein the processor is configured to decrease transparency of an area where the information is displayed on the transparent display.

9. The apparatus of claim 1, wherein if a text in a foreign language is included in the scanned object, the processor is configured to provide a translation of the text in the foreign language as the information on the transparent display.

10. The apparatus of claim 1, wherein the predetermined event is an event of entering into a scanning mode for scanning the object which is brought into contact with the transparent display.

11. A method of controlling a display apparatus comprising a transparent display, a scanner and a processor, the method comprising:
controlling the scanner to scan an object which is scanned through the transparent display by adjusting a position of the camera, the camera being connected to a hinge provided on an outer area of the display apparatus at one end such that a position of the camera is adjustable with respect to the transparent display; and controlling the processor to provide information corresponding to the scanned object to the transparent display, in response to occurrence of a predetermined event, wherein the scanner is arranged to be overlapped with a partial area of the transparent display in a rear side of the transparent display, the scanner performs an augmented reality (AR) function or a camera function and, the scanner is arranged to be overlapped with a partial area of the transparent display in the front side of the transparent display, and the scanner performs a scanning function of scanning the object scanned through the transparent display, wherein the scanner comprises a support of a predetermined length to be overlapped with the partial area of the transparent display, and the hinge is configured to enable the support to move.

12. The method of claim 11, further comprising:

controlling the scanner to sense brightness around the transparent display; and controlling the processor to adjust at least one of a luminance value and a chrominance value of a selected area corresponding to the information provided on the transparent display or another area on the transparent display, based on the sensed brightness.

13. The method of claim 12, further comprising controlling the scanner to turn on or off an illumination unit included in the scanner in response to the sensed brightness.

14. The method of claim 11, further comprising controlling the transparent display to display the information at a selected position on the transparent display based on a position where the object is scanned through the transparent display.

15. The method of claim 11, further comprising, if the scanner is positioned in the rear side of the transparent display, controlling the processor to crop an image of an area, which is covered by the scanner and is not viewable to a user from the front side, and display the cropped image on the transparent display to replace an image of the scanner scanned through the transparent display.

16. The method of claim 11, further comprising controlling the processor to decrease transparency of an area where the information is displayed on the transparent display.

17. The method of claim 11, wherein the predetermined event is an event of entering into a scanning mode for scanning the object which is brought into contact with the transparent display.

18. A non-transitory computer readable recording medium having recorded thereon a program for executing a method of controlling a display apparatus comprising a transparent display, a scanner and a processor, the method comprising:

controlling the scanner to scan an object which is scanned through the transparent display by adjusting a position of a camera, the camera being connected to a hinge provided on an outer area of the display apparatus at one end such that a position of the camera is adjustable with respect to the transparent display, and controlling the processor to provide information corresponding to the scanned object to the transparent display, in response to occurrence of a predetermined event, wherein the scanner is arranged to be overlapped with a partial area of the transparent display in a rear side of the transparent display, the scanner performs an augmented reality (AR) function or a camera function and, the scanner is arranged to be overlapped with a partial area of the transparent display in the front side of the transparent display, and the scanner performs a scanning function of scanning the object scanned through the transparent display, wherein the scanner comprises a support of a predetermined length to be overlapped with the partial area of the transparent display, and the hinge is configured to enable the support to move.

* * * * *